United States Patent [19]

Lelong

[11] Patent Number: 5,292,014

[45] Date of Patent: Mar. 8, 1994

[54] TENSILE SUPPORT DEVICE

[76] Inventor: Marion P. Lelong, 1308 Seaton La., Falls Church, Va. 22046

[21] Appl. No.: 73,317

[22] Filed: Jun. 8, 1993

Related U.S. Application Data

[63] Continuation-in-part of Ser. No. 770,912, Oct. 4, 1991, abandoned.

[51] Int. Cl.⁵ .............................................. E04B 1/34
[52] U.S. Cl. ........................................ 211/88; 47/39; 47/67; 211/107; 248/218.4
[58] Field of Search ............... 248/27.8, 205.1, 218.4, 248/219.1, 219.4; 47/67, 39; 211/88, 107, 90

[56] References Cited

U.S. PATENT DOCUMENTS

| | | | |
|---|---|---|---|
| 484,565 | 10/1892 | Allison et al. | 248/323 |
| 559,066 | 4/1896 | Schickluna | 248/219.4 |
| 1,002,510 | 9/1911 | Frisby | 211/90 |
| 1,154,627 | 9/1915 | Hall | 604/403 |
| 1,334,199 | 3/1920 | Weissman | 248/318 |
| 1,457,066 | 5/1923 | Kestner | 248/240.3 |
| 1,538,081 | 5/1925 | Bank | 47/67 |
| 1,754,082 | 4/1930 | Chase | 248/219.1 |
| 2,504,583 | 4/1950 | Rachic | 248/313 |
| 2,637,518 | 5/1953 | Young | 248/312 |
| 2,774,562 | 12/1956 | Henry | 248/125 |
| 2,928,641 | 3/1960 | Pfaff, Jr. | 248/219.1 |
| 4,084,779 | 4/1978 | Moineau | 248/318 |
| 4,098,483 | 7/1978 | Pesola et al. | 248/311.2 |
| 4,138,803 | 2/1979 | Sherlock | 47/67 |
| 4,147,320 | 4/1979 | Biedebach | 248/318 |
| 4,415,137 | 11/1983 | Garves | 248/629 |
| 4,666,115 | 5/1987 | Schiro | 248/225.1 |
| 4,744,171 | 5/1988 | Hilliard | 47/67 |
| 4,744,357 | 5/1988 | Buckley | 248/219.1 |
| 4,779,377 | 10/1988 | Davis | 47/67 |
| 4,811,475 | 3/1989 | Morton, Jr. | 29/521 |
| 4,877,210 | 10/1989 | Missala | 248/318 |

OTHER PUBLICATIONS

Pot Suspenders For Fences And Rails-forged iron bracket to support flower pots on a standard fence or hand railing, as item #2432 Rail Rider, in catalog of John Deere, 1400 3rd Avel, Moline, Ill. 61265.

"Hanging Planters", in pp. 20–25 of Gardening In Containers, Ortho Books, Chevron Chemical Co., Consumer Products Division, Box 5047, S an Ramon, CA 94583, 1983, 96 pages.

"No-Tools Outdoor Hanger for Plants, Bird Feeders, Chimes", in "Voice Of The Mountains", Summer Catalog 1993, of The Vermont Country Store, Rt. 100, Weston, Vt.

Primary Examiner—Henry E. Raduazo
Attorney, Agent, or Firm—Marion P. Lelong

[57] ABSTRACT

A tensile support device comprising a pair of rigid, elongated members which are horizontally disposed and attached closely together at their outer ends and held widely spaced apart by a cable or strap at their inner ends which rest against a supporting surface, such as a wall, a tree, a pole, or a plurality of balcony posts. A tensional support cable is fastened at its lower end to the outer ends of the members or to the connection between the outer ends of the members and at its upper end to the supporting surface, or to a window sill by using an auxiliary bracket, at a point substantially above the inner ends, whereby a compressive force is created along the rigid members when a plant container is hooked over the connection between the outer ends.

35 Claims, 2 Drawing Sheets

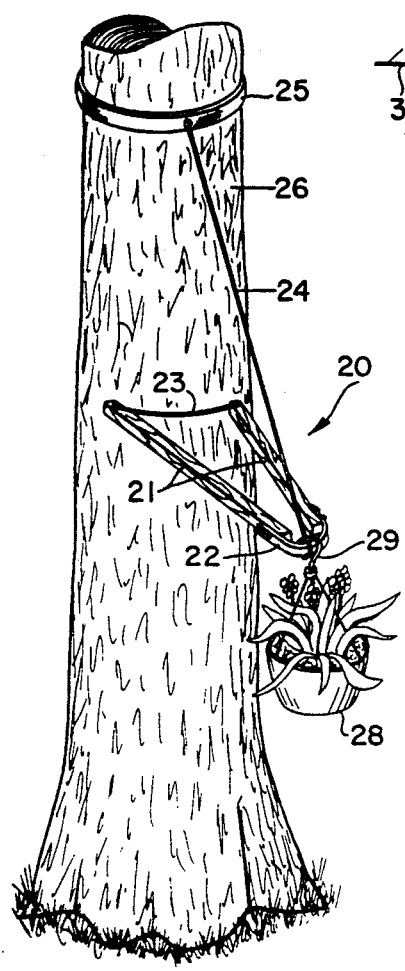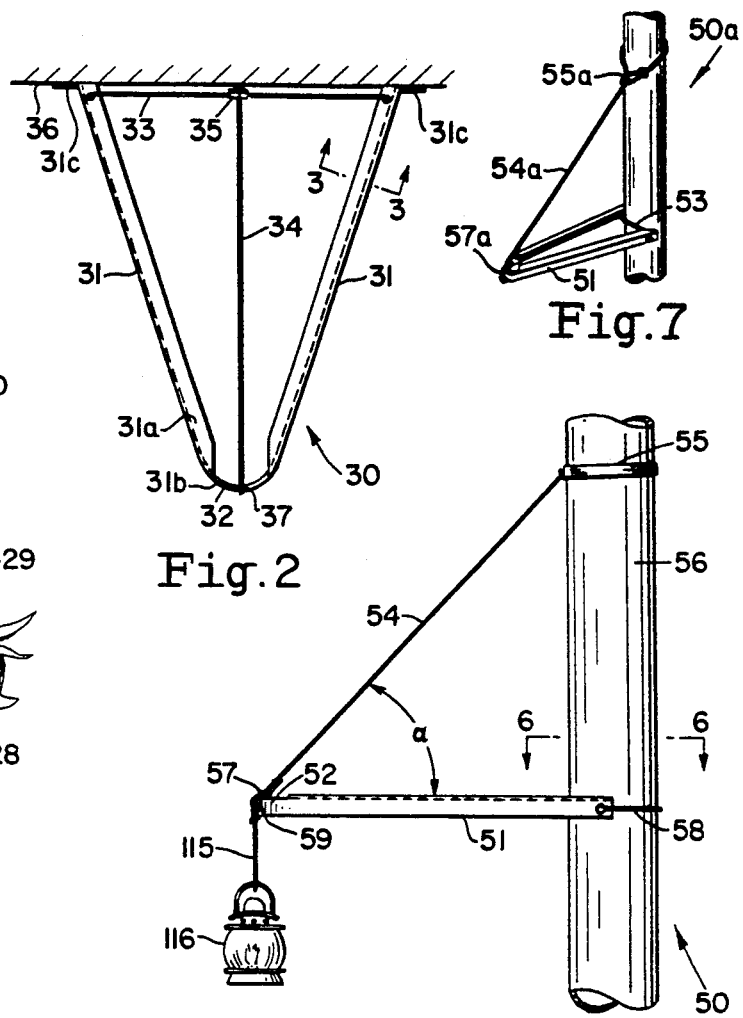

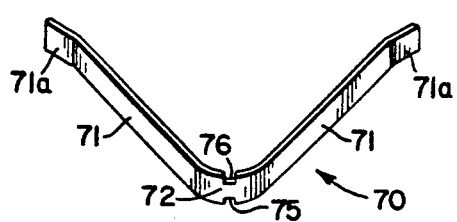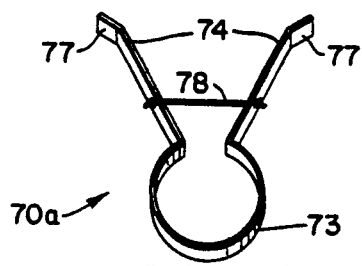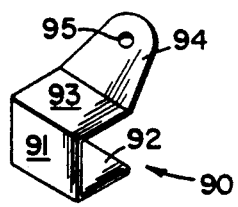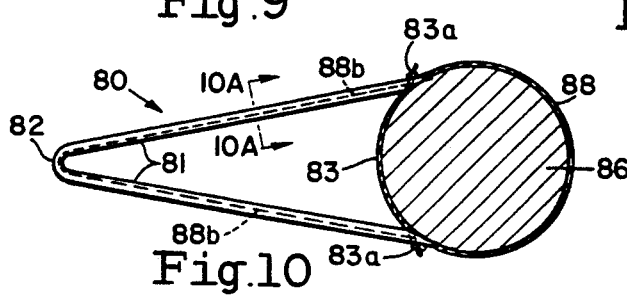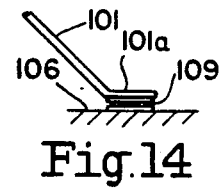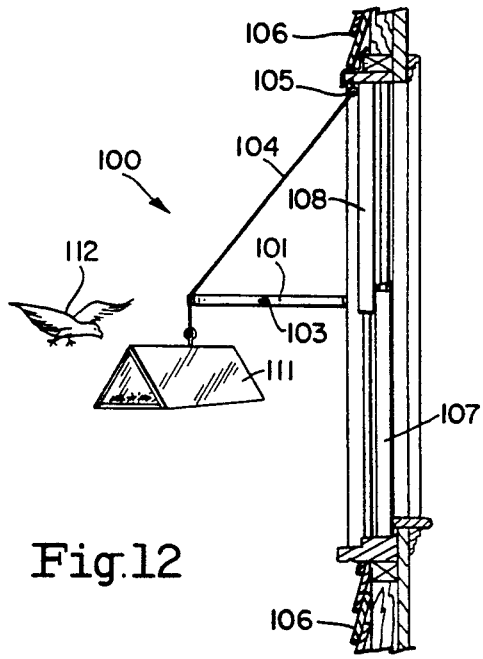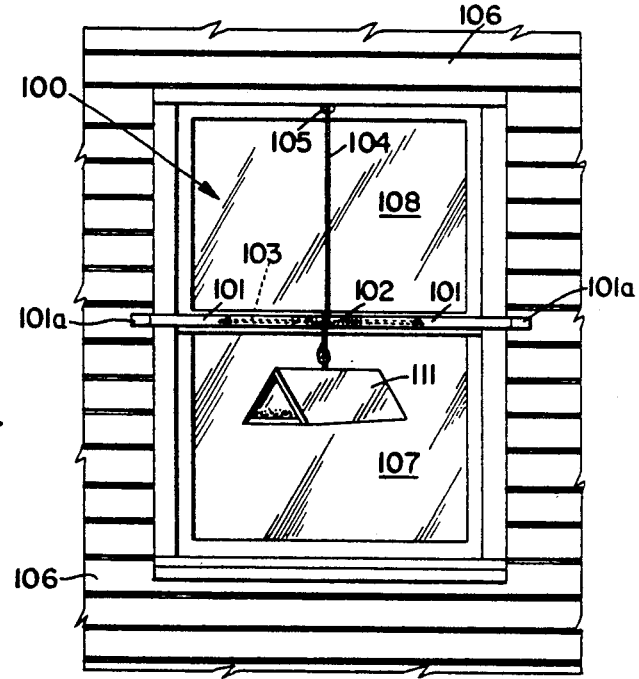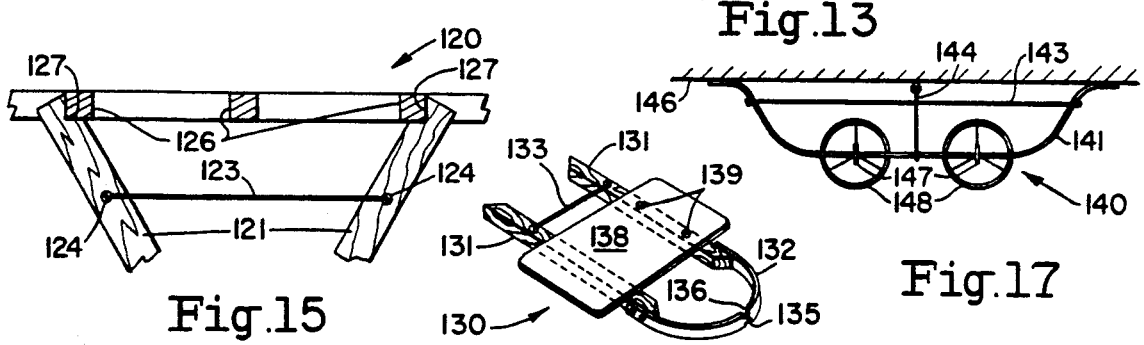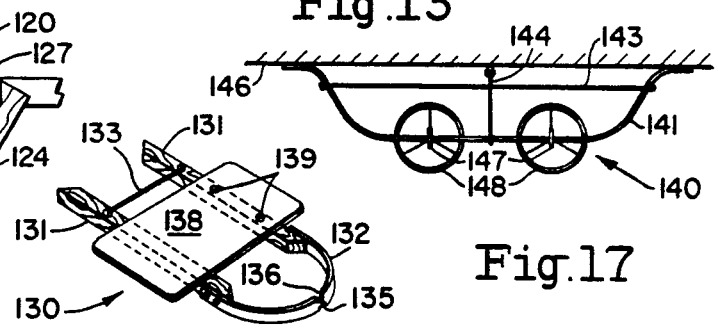

TENSILE SUPPORT DEVICE

STATUS OF APPLICATION

This application is a continuation-in-part of Ser. No. 07/770,912, filed Oct. 4, 1991 and now abandoned, entitled "DEVICES FOR TENSIONALLY SUPPORTING PLANT HANGERS" of Marion P. Lelong.

BACKGROUND OF THE INVENTION

1. Field of the Invention

This invention relates to devices for tensionally supporting hanging objects such as planters, comprising a container or pot for soil and plants and wire hangers which are attached to the container at at least three places and converge to form a hook. It especially relates to such devices which are attached to and offset from columns, such as tree trunks and vertically disposed poles, and other vertically disposed support surfaces, such as walls and corners of buildings.

2. Review of the Prior Art

Many types of pots, plant hangers, and support devices are known. Plant hangers are described in U.S. Pat. Nos. 4,084,779 of H. J. Moineau, 4,138,803 of H. P. Sherlock, 4,147,320 of L. W. Biedebach, 4,744,171 of W. G. Hilliard, 4,779,377 of C. A. Davis, 4,811,475 of J. C. Morton, Jr., and 4,877,210 of M. F. Missala.

Among known support devices, U.S. Pat. No. 484,565 of A. B. Allison et al describes a mast-arm for electric lights which comprises two laterally extending stationary arms which are connected at their outer ends and attached at their inner ends to a vertically disposed pole, an upwardly inclined tie rod extending from these outer ends to the pole, an oscillating arm pivoted at its outer end between the stationary arms, guides enclosing the inner end of the oscillating arm, and a flexible connection for moving the arm therein.

U.S. Pat. No. 559,066 of J. J. Schickluna also describes a mast-arm for electric lights which comprises a pair of converging side members which are pivotally attached to a vertically disposed pole at their inner ends and which converge at their outer ends, a supporting wire or cable which extends from these outer ends to the pole above the side members, a pulley casing and pulley which are mounted at the outer ends, and suspension cord which passes over the pulley.

U.S. Pat. No. 1,154,627 of E. E. Hall discloses a receptacle supported by chains attached to a central ring carrying a hook which engages a movable arm of a wall engaging bracket.

U.S. Pat. No. 1,334,199 of W. H. Weissman describes a pot supporter, for a pot having a ribbed edge, which comprises clamps consisting of a single length of wire bent to have a major portion adapted to engage the ribbed edge of the pot and further consisting of an auxiliary portion that bears against the inner surface of the pot and has curved extensions that are forced under the rib of the pot and thereby allow the clamp to sustain the proper amount of weight.

U.S. Pat. No. 1,538,081 of A. Bank relates to a suspension flowerpot comprising a metal bar having its bent end attached to a bracket, which is adapted to be secured to a wall by means of nails, while its other end is downwardly bent to form an arm ending in a hook on which a flowerpot is suspended.

U.S. Pat. No. 1,754,082 of P. H. Chase relates to a mast arm for hanging a lamp from the side of a pole. As shown in FIGS. 11-14, the device comprises a pair of laterally extending arms which are pivotally attached to opposite sides of the pole and which converge to an open nose at their outer ends. A sheave wheel is rotatably mounted within the sheave wheel. A rope or cable is passed over the sheave wheel and supports the lamp.

U.S. Pat. No. 2,504,583 of J. Rachic relates to a bracket for supporting a flower pot adjacent a window. This bracket comprises a main body portion having a scroll-shaped lower end, which is adapted to engage a wall or window frame, and a scroll-shaped upper end of an arm which extends in a horizontal plane and has a perforated flattened end for securing the arm to the bottom of the sill of the window by fasteners, whereby the relation of the plane of the arm to the plane of the body is such that the body will support a pot on the curved flange formed at the upper end of the body in a vertical plane with relation to the horizontal plane of the arm.

U.S. Pat. No. 2,637,518 of W. R. Young describes a receptacle support for suspending containers from a vertical wall, comprising a bracket member formed from a meal plate and including a wall engaging portion, which is pierced with an opening for engaging a nail projecting from the supporting wall, and a horizontal arm, which is formed by bending the plate along a horizontal line, and has a curved outer edge and two lanced-out loops or inverted channels forming guide eyes for a snare formed of soft metal which can be manipulated without difficulty, takes a permanent set, and is strong enough to retain this set under normal loads imposed by supporting the container, around which it is wrapped.

U.S. Pat. No. 2,774,562 of W. F. Henry relates to an apparatus for supporting a receptacle, such as a flower pot, from the vertical railing of a porch or of a window or from a vertical column, such as the column of a building, a pipe, or a power line or telegraph or telephone line pole. This apparatus includes a C-shaped bracket or frame, formed into a shape corresponding to the cross section of the railing or column, which has a plane surface, a pair of holes along one side, and a pair of upwardly extending ears along the other side. The holes and the ears are spaced apart by a distance equalling the width or diameter of the railing or column. The apparatus further comprises a ring that encircles and supports the receptacle and becomes at one side a pair of arms which overlie the bracket between the ears and end in hooks or small bends which engage the holes, thereby providing cantilever support to the receptacle.

U.S. Pat. No. 2,928,641 of H. C. Pfafff, Jr. discloses a traffic light holder comprising a pair of straight, parallel arms which are united at adjacent ends to form a generally U-shaped frame. The frame is attached at its inner end to a pole so that the arms are vertically aligned. A supporting tie rod is secured at its opposite ends to the pole and the frame and is inclined with respect to both. Light units are mounted within the frame near its outer end.

U.S. Pat. No. 4,098,483 of J. E. Pesola et al relates to a plant hanger comprising an elongated member which is bent down at both ends and a bracket which is attachable by itself to the face of a molding or casing of a building and has two spaced ears. A swivel depends from one end of the elongated member for supporting a container. The opposite end of the member is held in the bracket ears.

U.S. Pat. No. 4,415,137 of J. C. Garves relates to cantilever attachment to a column, such as the iron posts which support railings around apartment balconies, to support a weight, such as a flower pot. A cantilever assembly comprises a cantilever member having a hook, formed by curving upward the distal end of the member, and a base, formed by curving downwardly the inner end of the member, which is vertically disposed and rests against an iron post. This base is further curved outwardly to form a resilient means that underlies and supports the cantilever member and has a transversely disposed pin. The cantilever assembly further comprises a U-shaped attachment means that fits around the iron post and terminates in hook portions which engage the pin.

U.S. Pat. No. 4,666,115 of J. C. Shiro describes a hanger for supporting plants on fences and other surfaces, comprising a support member with a horizontal portion and an angular portion extending from the bottom of the horizontal portion at a selected angle. Strengthening members are attached to the inner end of the horizontal portion, and a holding member in the form of a transversely disposed peg extends from both sides of the inner end and is placed on the far side of the fence. The front or outer end of the support member is provided with both a hole and a vertically disposed peg to which a plant container is attached. A stop block, which may be either fixed or adjustable, is mounted on the rear or inner end of the angular portion and rests against the near side of the fence, whereby the horizontal portion is in tension and the angular portion is in compression when the hanger is mounted on the fence and a plant is being supported.

U.S. Pat. No. 4,744,537 of R. R. Buckley relates to a hanging device for various applications which comprises a hanging bracket, an elastic band, a sling, and a shackle. The hanging bracket comprises, when the device is mounted upon the trunk of a tree, a vertically disposed angle bracket and a horizontally disposed angle bracket which is welded at one end to the vertically disposed bracket.

Many gardens contain extensive shaded areas that could be graced with hanging plants. However, with the exception of the Buckley hanger bracket, none of these plant hanging devices of the prior art is suitable for mounting on the trunk of a tree. The Buckley hanger bracket appears to lack lateral stability during a high wind. The cantileverly supported devices are apparently likely to damage living trees and deform wooden surfaces. Those that permit a plant container to be hung a substantial distance from a supporting surface are relatively complicated. Some are closely restricted as to materials of construction. No device appears to be sufficiently versatile for selective use on trees, telephone poles, walls, windows, walls and corners of buildings, fences, and metal or wooden balcony posts.

There is accordingly a need for a simple, inexpensive, and versatile tensional support device that: (a) is both laterally and vertically stable and (b) enables a lantern, a bird feeder, a bird bath, a plant pot, and/or a plant container to be hung a selected distance from a wide variety of supports, including living trees, without damage thereto.

SUMMARY OF THE INVENTION

It is therefore an object of this invention to provide a tensional support device that is simple in construction, versatile in use, and manufacturable from a variety of materials.

It is another object to provide a tensional support device that can be mounted on trees and wooden and metal poles.

It is a further object to provide tensional support device that can be mounted on walls and corners of buildings, fences, and railings of balconies.

It is an additional object to provide a tensional support device that can be constructed from rods, strips, angles, and tubing made from plastic, wood, or metal.

In accordance with these objects and the principles of this invention, a tensional support device is herein provided that is laterally stable, inexpensive to construct, simple, light in weight, versatile, easy to relocate, adaptable for mounting on flat, angular, or columnar support surfaces, and capable of supporting a plant container, a lantern, a bird feeder or bath, and like objects at a selectively large distance from the support surface.

This device comprises a pair of rigid members having first and second ends and a predetermined length, the first ends being adjacent and connected together, the pair of rigid members being joined along the length thereof by means of a first flaccid tensile element and the second ends being adapted to frictionally engage a vertically disposed surface, the device further including a second flaccid tensile element having first and second ends, the first end being attached to the rigid members at or adjacent to the first ends thereof and the second end being attachable to the vertically disposed surface. The vertically disposed surface is selectively a flat surface, such as the wall of a building, an angular surface, such as the corner of a building, or a curved surface, such as a tree trunk, telephone pole, or flagpole.

The device may also be described, when mounted on a vertically disposed support surface, as comprising a pair of elongated and rigid compression members which are horizontally disposed in preferably converging relationship so that one pair of their ends is closely adjacent and the other pair of their ends is spaced widely apart to provide lateral stability, a second flaccid tension member having a first end which is attached to the rigid member at or adjacent to the first ends thereof and a second end which is attached to the support surface, a connecting means for the closely adjacent ends, and a flaccid connecting means for the rigid members along the length thereof. The compression members, however, may be spaced widely apart at both ends if the connecting means for the closely adjacent ends is sufficiently rigid. The compression members are preferably straight but may be selectively curved if sufficiently rigid to resist twisting.

When mounted on a support so that: (1) the members are horizontally disposed and spread apart at the spaced-apart ends, (2) the spaced-apart ends are resting against the surface of the support, and (3) the second flaccid tensional element is attached at its upper end to the support surface and at its lower end to the adjacent ends or to the adjacent connecting means, a compressive force is generated along each of the rigid members and a tensional force is generated along the first flaccid connecting means when a weight, such as a plant container having soil and a plant therein, is suspended from the adjacent ends or from the adjacent connecting means and/or when a weight, such as another plant container, is mounted on a platform atop the rigid members. A further weight can be suspended beneath the rigid members by three flaccid tensile elements, such as string or wire, one of which is attached to the adjacent ends or to the adjacent connecting means and the other two to the two spaced-apart second ends of the rigid members, thereby generating further compression forces along the rigid members.

Three objects can thereby be supported at different elevations by a tensile support device: (1) from the adjacent connecting means where the converging rigid members meet to form the point of a V, (2) atop a platform supported by the rigid members, and (3) when suspended beneath the rigid members by three additional flaccid tensile elements.

Notches are preferably cut into the uppper and lower edges of the adjacent connecting means at the mid-point thereof in order to accommodate and hold the hook of a plant container and the lower end of the second flaccid tensile element, respectively. A slight twisting force may be generated by this arrangement.

Alternatively, a pair of holes, vertically aligned, may be formed in the adjacent connecting means at its mid-point for accommodating the lower end of the second flaccid element in the upper hole and the hook of a plant container in the lower hole. This arrangement eliminates twisting forces generated by the alignment of the second flaccid tensile element and the object being supported.

Either arrangement removes stresses from the rigid members except for compression forces which are determined by the cosine of the angle, $\alpha$, between the rigid members and the second flaccid tensile element. If the weight supported by the device is small, it is usually desirable to decrease $\alpha$ in order to provide greater compression forces against the support surface, thereby increasing the lateral stability of the device against strong cross winds.

If such lateral stability is insufficient or if the columnar surface is very smooth or if there is a likelihood that a squirrel will leap upon the rigid members and thereby dislodge their first ends from the support surface, it may be desirable to provide an additional flaccid tensile element that is attached to both first ends and is tightly wrapped around the tree trunk or other columnar support surface.

When the rigid and elongated members are formed from angle metal, the adjacent connecting means is the vertically disposed portion of the angle metal, bent to form the appropriate dihedral angle between the members. When these members are formed from metal tubing or plastic tubing, the tubing is simply bent, while being deformed or flattened, to make the adjacent connecting means.

When the device is to be mounted on a tree, the upper surface of the angle metal is preferably cut away at each inner end so as not to cut into the bark of the tree, and the vertical surface of the angle metal is preferably bent in parallel to the bark of the tree at each inner end. Similarly, the inner ends of a metal bar or of metal or plastic tubing are preferably flattened and bent for the same purpose.

If desired, the dihedral angle between the members may be made so large that the inner ends do not contact the tree surface at all, whereby all lateral support is provided by the first flaccid tensional connecting means.

The first flaccid tensile element, i.e., the spaced-apart connecting means, is preferably a length of wire, rope, or strong string which joins the rigid members along the length thereof or is attached to the second ends of the rigid members and is in tension when the device is mounted on a tree, pole, or flat or angular surface. If the support surface offers no lateral support to the inner ends of the rigid members, the first flaccid tensile element is capable of bearing all of the lateral forces exerted along the rigid members, provided that the first flaccid tensile element is at least near to the second ends of the rigid members.

As another alternative embodiment, a rigid sheet, in the form of a truncated triangle, for example, and made of thin plywood, metal, plastic, or hardboard, is attached along the length of one of the rigid members and forms a shelf for sustaining an object, such as a plant container, in addition to the suspended object, such as another plant container. The rigid members may be selectively moved in their angular relationship, without affecting the shelf, so that their second ends may be selectively adjusted to the supporting surface.

For sustaining such a shelf, as still another embodiment, the rigid members are preferably widely spaced apart at both ends, the connecting means is a sufficiently rigid section of metal or plastic to prevent twisting but is selectively bendable in the plane of the rigid members to enable the rigid members to be selectively moved for adjusting the positions of the second ends to fit the support surface, and the shelf is approximately square or round.

When the device is to be mounted on a balcony, the inner ends of the rigid members may be cut to fit against selected balcony posts and provide lateral support in alignment with axial compressive forces against the posts. The cutting may alternatively provide lateral support transversely thereto to prevent spreading apart of the inner ends or to prevent converging thereof. The first flaccid tensile element is in tension in either situation. When converging is being prevented, the first flaccid tensile element is attached to the rigid members and is passed on the far side of the posts. When spreading apart is being prevented, the first flaccid tensile element is attached and functions in the same way as for other embodiments.

In combination with members made of any material and connecting means of any type, the second flaccid tensile element, i.e., the tensional support means, is preferably a length of wire, rope, chain, cable, or the like which is attached at its first end, i.e., its lower end, to the adjacent connecting means or to the outer ends of the members and at its second end, i.e., its upper end, to the surface of a support, such as a tree, pole, wall, picket or chain fence, balcony posts, window sill, or the like.

BRIEF DESCRIPTION OF THE DRAWINGS

FIG. 1 is a perspective view of a plant support device of this invention, using square wooden rods as its rigid members and a bendable metal strip at the second ends, i.e., the outer ends, thereof, that is attached to and supported by a tree by means of its second flaccid tensile element.

FIG. 2 is a top view of another embodiment, using a single piece of angle aluminum as its rigid members and adjacent connection means, that is attached to and supported by a wall.

FIG. 3 is a perspective view, taken along the arrows 3—3 in FIG. 2 and looking toward the second end of one of the rigid members. The rigid member is made of angle metal, with its top surface cut away so as not to damage a support surface and its vertical surface bent for the same purpose, to be approximately in parallel with the support surface.

FIG. 4 is a partial top view of a support device having its inner ends cut to conform to the cross sections of the square posts of a balcony to provide lateral support against spreading movement of the members and additionally having a first flaccid tensile element to ensure tightness of contact.

FIG. 5 is a side elevation of a support device, using a single piece of angle aluminum as its rigid members and adjacent connecting means, that is bent to form a V and is attached to and supported by a metal pole. A third flaccid tensile element is also attached to the second ends of the rigid members and tightly encircles the pole.

FIG. 6 is a top sectional view, taken along the arrows 6—6 in FIG. 5, of the inner ends of the rigid members and the first and third flaccid tensile elements.

FIG. 7 is an isometric view of the device shown in FIGS. 5 and 6, except that it shows another embodiment of the second flaccid tensile element which is in the form of a sling that encircles the pole.

FIG. 8 is a top view of a corner of a building being used as a support surface for a device formed from wooden rods and a connecting strip of bendable metal or plastic that is preferably resistant to twisting, the first flaccid tensile element being in contact with the corner and bearing the compressive forces.

FIG. 9 is a perspective view of a V-shaped device made of a bendable strip of metal or plastic which has its second ends bent to be approximately parallel to the support surface and its connecting means notched at its bottom edge for attachment of a second flaccid tensile element and notched at its top edge for suspending a plant container or like weight.

FIG. 9a is a modified version of the device shown in FIG. 9 having a circular connecting means.

FIG. 10 is a top view of a device made of tubing, either metal or plastic, and the spaced-apart connecting means which passes through and is in tension between the second ends of the members and also encircles the pole, while the first flaccid tensile element connects the second ends of the rigid elements and supports the compression forces thereof because the second ends of the rigid members merely abut the pole.

FIG. 10A is a sectional view, taken in the direction of the arrows 10A—10A in FIG. 10.

FIG. 11 is an isometric view of a window sill support for the tensional support means.

FIG. 12 is a side view of a building having double-hung windows and of a tensional support device of the invention which is attached to the side of the building, astraddle the upper window, and supports a bird feeder.

FIG. 13 is a front view of the building and device shown in FIG. 12.

FIG. 14 is an edge view of a bent second end of one of the rigid members of the device shown in FIG. 13 and of the Velcro ® strips attached thereto and to the side of the building. FIG. 15 is a partial top view, similar to FIG. 4, of still another embodiment of the device which has its second or inner ends cut to conform to the cross sections of the metal posts of a balcony so that lateral support is provided against converging movement of the rigid members by the first flaccid tensile element.

FIG. 16 is a perspective view of another embodiment having rigid members in approximately parallel and widely spaced-apart relationship and supporting a platform which is attached to merely one of the rigid members.

FIG. 17 is a top view of an additional embodiment of the support device of the invention in which a single rigid element is bent in the form of an archery bow, is supported by a single second flaccid tensile element at its mid-point and supports a pair of plant baskets while its second ends rest against a vertically disposed wall.

DESCRIPTION OF THE PREFERRED EMBODIMENTS

Referring to FIG. 1, a tensional support device 20 is supported by and attached to a tree trunk 26. Device 20 comprises a pair of rigid members 21, having spaced-apart second or inner ends resting on the bark of trunk 26 and held by its first flaccid tensile element 23. The adjacent ends of members 21 are connected by a strip of bendable metal 22 that resists twisting. Second flaccid tensional element 24, in the form of a cable or rope, is fastened at its upper end to a nylon or polypropylene belt 25 that encircles tree trunk 26 and is fastened at its lower end to strip 22. A plant container 28, having a three-wire support, is suspended by its hook 29 which is hung over strip 22.

Referring to FIGS. 2 and 3, a device 30 of this invention, made from a single piece of angle aluminum which is bent at its middle through a section 32 of its vertical portion 31b, after removal of a section of its horizontal portion 31a, is attached to and supported by a wall 36 upon which bent portion 31c of the second ends of its rigid members 31 rest. First flaccid tensile element 33, in the form of a cable or rope, is fastened at its ends to these second ends. Second flaccid tensile element 34 is fastened to a bolt 35 in wall 36 at its upper end and to bent midsection 32 at its lower end where it passes through a notch 37 in the bottom edge thereof. More specifically, angle aluminum member 31 has a horizontal surface 31a which is cut out at 32 and a vertical surface 31b which is bent to form flap 31c. Bent flap 31c is at a suitable angle for contact, for example, with delicate bark or a wooden surface which should not be marred.

Referring to FIG. 4 which shows a portion of a device 40, a pair of rigid members 41 are supported by and attached to square posts 46 of a balcony. Inner ends 47 of members 41 are cut out to provide lateral support, both perpendicularly to the plane of posts 46 and in parallel thereto, to prevent spreading apart of members 41. Screws 44 are provided in the second ends of members 41, and a cable or rope 43 is passed around these screws 44 and tightly around outer posts 46.

Referring to FIGS. 5 and 6, a device 50 is attached to and supported by a metal pole 56 having a smooth surface. Rigid members 51 are fastened together at their second ends by a cable or rope 53 which passes through holes in the second ends, is knotted at 53a, and is tightly wrapped around pole 56 as loop 58 to provide vertical stability. Knots 53a prevent members 51 from spreading apart further, but the second ends, which are bevelled to be substantially parallel to the surface of pole 56, do not rest upon or obtain support for the longitudinally directed compressive forces created by a weight, such as lantern 116 which is suspended by line 115 from connecting means 52. Because the second ends, i.e., the inner ends, of members 51 are substantially parallel to the cylindrical surface of pole 56, the compressive forces exerted along members 81 are borne entirely by first flaccid tensile element 53. The first ends, i.e., the outer ends of members 51, are bent in mid-section 52 which functions as the adjacent connecting means, in the same manner as shown in FIG. 2. This mid-section 52 has a notch 59 at its bottom to which loop 57 of second flaccid tensile element 54 is attached. The upper end of second flaccid tensile element 54 is attached to a broad band 55 around pole 56. Band 55 may be a leather belt or preferably a woven strap of synthetic fiber having resistance to weather.

FIG. 7 shows another embodiment 54a of second flaccid tensile element 54. Its upper or second end is in the form of a loop 55a, whereby element 54 is easily wrapped around post 56 as a sling, thereby eliminating band 55.

FIG. 8 is a top view of a building having walls 66 which form a corner that supports a tensile support device 60 of this invention. Rigid members 61 may be made of wood, for example, and are joined by a bendable but twist-resistant strip 62 which is fastened to the first ends of members 61 by a pair of screws 64. First flaccid tensile element 63 is fastened to members 61 at a slight distance from second ends 68 thereof and provides the entire lateral support for the device by being in tensional contact with the corner of the building, ends 68 being tapered and in sliding contact with building walls 66.

The tensile support device 70 that is shown in FIG. 9 is made from a strip or bar of metal or plastic that is bendable but resistant to twisting. This bar is bent to form a V comprising straight members 71, mid-section connecting means 72 having upper notch 76 and lower notch 75, and bent ends 71a.

Referring to FIG. 10, a tensional support device 80, shown in top view, comprises a pair of members 81 and a bent mid-section 82, as the adjacent connecting means, which are formed from a single piece of copper or plastic tubing. The inner ends of members 81 are flattened and thereby bevelled so as to be substantially in parallel to the surface of a pole 86. A continuous cable 83b passes entirely through members 81 and midsection 82, is knotted at 83a beyond each inner end, and passes entirely around pole 86 as loop 88. In addition, first flaccid tensile element 83, as a spaced-apart connecting means, is also fastened to knots 83a and supports the compressive forces exerted in alignment with members 81 whenever a weight, such as a plant container, is suspended from mid-section 82.

FIG. 10A is a section of a member 81, taken in the direction of the arrows 10A—10A in FIG. 10, which shows tensile element 83b therewithin.

FIG. 11 is a perspective view of a bracket 90 having a lower horizontal surface 92, a vertical surface 91, an upper horizontal surface 93 which fits over a window sill, and an inclined flap 94 with a central hole 95 therein for fastening a second flaccid tensile element, such as elements 24, 34, 54.

FIGS. 12, 13, and 14 show the clapboard side 106 of a building having upper and lower double hung windows 107, 108. A tensional support device 100 of this invention is mounted astraddle of upper window 108. Rigid members 101, joined by connecting strip 102, have bent ends 101a which are disposed outside of upper window 108 and its frame. Ends 101a are fitted with Velcro ® strips 109 which are attached to side 106. A bird feeder 111, to which a bird 112 is flying, is suspended from strip 102. Second flaccid tensile element 104 is attached at its lower end to strip 102 and at its upper end to an eye 105 attached at the top of the frame for window 108.

FIG. 15 shows a portion of a device 120 that is similar to device 40 shown in FIG. 4. However, the second ends of members 121 are cut at 127 to provide lateral support against the compressive forces exerted along members 121 and to prevent converging movement of members 121. First flaccid tensile element 123 is attached to screws 124 in members 121 at a distance from the second ends thereof and is tightly in tension.

FIG. 16 is a top perspective view of an embodiment 130 comprising a pair of rigid wooden members 131, a circularly curved strip 132 that is bendable but twist resistant, and a thin platform 138 which is attached by screws 139 to one of the members 131. Members 131 may accordingly be moved as needed so that their second ends can be suitably fitted to the support surface. Members 131 and strip 132 are attached by screws. Strip 132 is provided with upper notch 136 and lower notch 135. First flaccid tensile element 133 is attached to both members 131.

FIG. 17 shows still another embodiment of the tensile support device of the invention. It comprises a pair of rigid members 141 formed into the shape of an archery bow from a single piece of bendable metal or plastic. The second ends of members 141 are bent so that they are parallel to vertically disposed wall surface 146. Second flaccid tensile element 144 is attached to wall 146 and inclines downwardly to the midpoint of the bow where members 141 meet. First flaccid tensile element 143 is attached to both members 141. Plant baskets 148 are hung over members 141, equidistant from the junction thereof. For better balance, two or even three flaccid tensile elements 44 may be used.

While the invention has been described with reference to various specific embodiments, other modifications and variations of the invention may be constructed without departing from the spirit and scope of the invention which is defined in the following claims.

What is claimed is:

1. A tensile support device comprising a pair of rigid members having first and second ends and a predetermined length, said second ends being spaced apart for lateral stability and being adapted to engage a vertically disposed support surface, a connecting means for said first ends, a first flaccid tensile element which conjoins said rigid members along the length thereof, and a second flaccid tensile member having a first end which is attached to said connecting means and a second end which is attachable to said support surface.

2. The tensile support device of claim 1, wherein said vertically disposed support surface is a flat, angular, or curved surface.

3. The tensile support device of claim 1, wherein said curved surface is an upright column selected from the group consisting of a tree trunk and an upright pole.

4. The tensile support device of claim 2, wherein said rigid members are horizontally disposed in converging relationship so that said first ends are closely adjacent.

5. The tensile support device of claim 1, wherein said rigid members are approximately parallel, said connecting means being sufficiently rigid to prevent twisting thereof.

6. The tensile support device of claim 5, wherein a platform is attached to on of said rigid members and is supported by both said rigid members.

7. The tensile support device of claim 5, wherein said connecting means is a bendable strap.

8. The tensile support device of claim 7, wherein a platform is attached to one of said rigid members and is supported by both said rigid members.

9. The tensile support device of claim 7, wherein said bendable strap is provided with a notch in the upper edge thereof and a notch in the lower edge thereof, both notches being at approximately the midpoint of said strap.

10. The tensile support device of claim 7, wherein said strap is provided with a pair of vertically aligned holes at the midpoint of said strap, said second flaccid tensile element being attached to the upper of said holes and a selected object being suspendable from the lower of said holes.

11. The tensile support device of claim 2, wherein said rigid members are formed from a single bendable strap which is bent at the midpoint thereof as said connecting means.

12. The tensile support device of claim 11, wherein said bendable strap is provided with a notch in the upper edge thereof and a notch in the lower edge thereof, both notches being at approximately the midpoint of said strap.

13. The tensile support device of claim 12, wherein said strap is provided with a pair of vertically aligned holes at the midpoint of said strap, said second flaccid tensile element being attached to the upper of said holes and a selected object being suspendable from the lower of said holes.

14. The tensile support device of claim 3, wherein said second flaccid tensile element has a loop at said second end thereof, whereby said element is attachable to said tree trunk as a sling.

15. The tensile support device of claim 2, wherein said pair of rigid members are subjected to compressive forces and said flaccid tensile elements are subjected to tensile forces when a selected object is suspended from said connecting means.

16. The tensile support device of claim 15, wherein said rigid members are formed from angle metal having two flanges disposed at about 90°.

17. The tensile support device of claim 16, wherein said rigid members are formed from a single piece of said angle metal having a middle between outer ends thereof, one said flange of said angle metal being cut away on each side of said middle, the other said flange of said single piece being bent at said middle to form said connecting means, said outer ends becoming said second ends of said rigid members.

18. The tensile support device of claim 17, wherein said one said flange is additionally cut away adjacent said second ends and said other said flange adjacent said second ends is bent.

19. The tensile support device of claim 17, wherein, when said device is mounted on said flat, angular, or curved surface to support a plant container as said selected object, said angle metal has a vertically disposed portion, as one said flange, and a horizontally disposed portion, as the other said flange which is cut away in the middle of said single piece to enable said vertically disposed portion of said rigid members to be bent at said middle to form an acute angle therebetween, said horizontally disposed portion of said second ends also being cut away to expose vertically disposed portions which are bent in parallel to said flat, angular, or curved surface.

20. The tensile support device of claim 2, wherein said curved surface is cylindrical, said first flaccid tensile element joins said pair of rigid members at said second ends, and said second ends are spaced apart sufficiently that said first tensile element frictionally engages said curved surface and bears all of said compressive forces.

21. The tensile support device of claim 20, wherein said cylindrical surface is a pole having a smooth surface and said second ends of said first tensile element are attached to a third flaccid tensile element which is tightly wrapped around said pole to provide vertical stability.

22. The tensile support device of claim 20, wherein said curved surface is the trunk of a tree and said second end of said second tensile element is attached to a band surrounding said trunk.

23. The tensile support device of claim 19, wherein said second end of said second tensile element is attached to a bracket which fits over a window sill, said second ends of said rigid members being in frictional engagement with said flat surface beneath said window sill.

24. The tensile support device of claim 2, wherein said rigid members are wooden rods.

25. The tensile support device of claim 24, wherein said adjacent first ends of said wooden rods are connected together by a bendable but stiff wire.

26. The tensile support device of claim 24, wherein said connecting means is a rigid, elongated metal strap which is attached at its ends to said first ends of said wooden rods.

27. The tensile support device of claim 2, wherein said pair of rigid members are formed from metal or plastic tubing which is bent and flattened or deformed in approximately the middle of said predetermined length to form said connected together first ends.

28. The tensile support device of claim 27, wherein said second ends of said tubing are flattened, bent, or bevelled.

29. The tensile support device of claim 2, wherein said device is mounted on a balcony and said second ends of said rigid members are cut to fit against selected balcony posts.

30. A tensile support device comprising a pair of rigid members having first and second ends and a predetermined length, said first ends being adjacent and connected together, said pair of rigid members being joined along the length thereof by means of a first flaccid tensile element and said second ends being adapted to frictionally engage a vertically disposed surface, said device further including a second flaccid tensile element having first and second ends, said first end being attached to said rigid members at or adjacent to said first ends and said second end being attachable to said vertically disposed surface.

31. The tensile support device of claim, 30, wherein said device is mounted on a balcony and said second ends of said rigid members are cut to fit against selected balcony posts and provide lateral support in alignment with axial compressive forces against said posts or alternatively lateral support transversely thereto, said first flaccid tensile element being arranged around said balcony posts to be in tension during both said lateral supports.

32. The tensile support device of claim 30, wherein said pair of rigid members are formed from a single piece of bendable metal or plastic into the shape of an archery bow, said second ends of said members being bent to be in parallel with said vertically disposed surface, whereby a plurality of selected objects are suspendable from said members.

33. The tensile support device of claim 30, wherein said device straddles a window and said second ends of said members frictionally engage a wall surrounding said window as said vertically disposed surface.

34. The tensile support device of claim 33, wherein said second ends are provided with Velcro ® pads.

35. The tensile support device of claim 30, wherein said first ends of said rigid members are formed into a circle that is adapted to receive a cylindrical object.

* * * * *